United States Patent
Eckerdt

(10) Patent No.: US 8,513,544 B2
(45) Date of Patent: Aug. 20, 2013

(54) AUTHORIZATION SYSTEM AND METHOD USING A WEIGHING SCALE TO CONTROL ACCESS BASED ON A REGISTERED WEIGHT OF A KEY AND KEY RING COMBINATION

(75) Inventor: George H Eckerdt, Fishers, NY (US)

(73) Assignee: Key Systems, Inc., Victor, NY (US)

( * ) Notice: Subject to any disclaimer, the term of this patent is extended or adjusted under 35 U.S.C. 154(b) by 496 days.

(21) Appl. No.: 12/858,536

(22) Filed: Aug. 18, 2010

(65) Prior Publication Data

US 2012/0043139 A1   Feb. 23, 2012

(51) Int. Cl.
G01G 19/00 (2006.01)
E05B 47/00 (2006.01)
E05B 35/00 (2006.01)

(52) U.S. Cl.
USPC ......... 177/25.19; 177/245; 70/262; 70/278.1; 700/305; 702/173

(58) Field of Classification Search
USPC .............. 177/25.19, 245; 340/5.2; 70/278.1, 70/262; 700/305; 702/173; 235/383
See application file for complete search history.

(56) References Cited

U.S. PATENT DOCUMENTS

| | | | |
|---|---|---|---|
| 5,378,860 A * | 1/1995 | Dingfelder et al. | 177/25.19 |
| 5,418,354 A * | 5/1995 | Halling et al. | 235/383 |
| 5,497,314 A * | 3/1996 | Novak | 705/17 |
| 5,608,193 A * | 3/1997 | Almogaibil | 177/25.13 |
| 6,038,465 A * | 3/2000 | Melton, Jr. | 600/407 |
| 6,215,078 B1 | 4/2001 | Torres et al. | |
| 6,237,098 B1 | 5/2001 | Libicki | |
| 6,246,967 B1 | 6/2001 | Libicki et al. | |
| 6,553,331 B2 | 4/2003 | Sakagami | |
| 6,707,381 B1 | 3/2004 | Maloney | |
| 6,711,681 B1 | 3/2004 | Al-Salqan et al. | |
| 6,844,506 B2 | 1/2005 | Nuesch et al. | |
| 7,239,724 B2 | 7/2007 | Sznba | |
| 7,461,784 B2 * | 12/2008 | Robkin et al. | 235/383 |
| 7,589,287 B1 * | 9/2009 | Hargabus | 177/25.13 |
| 2005/0173527 A1 * | 8/2005 | Conzola | 235/385 |
| 2010/0321149 A1 * | 12/2010 | Foster | 340/5.2 |

* cited by examiner

Primary Examiner — Randy W Gibson
(74) Attorney, Agent, or Firm — Eugene Stephens; Christopher B. Miller

(57) ABSTRACT

Weight is used to help identify key and ring combinations authorized to certain persons. This is done by associating a weigh scale with each storage box for key and ring combinations, all of which have different total weights. The weights of all the key and ring combinations are registered with a computer, along with authentication and storage information. Then as key and ring combinations are removed from or returned to a storage box, they are weighed on scale 25 so that a computer can compare the scale weight with a registered weight. For any discrepancy, the computer can initiate one of many security actions.

16 Claims, 3 Drawing Sheets

AUTHORIZATION SYSTEM AND METHOD USING A WEIGHING SCALE TO CONTROL ACCESS BASED ON A REGISTERED WEIGHT OF A KEY AND KEY RING COMBINATION

TECHNICAL FIELD

Key authorization systems

BACKGROUND

Controlling and managing authorized access to key assets grows increasingly complex. The various authentication methods that are already known include tamper-resistant key rings; serial numbers on keys; PINs to gain access to keys; locked storage boxes for keys; biometric identifiers of people authorized to access keys; control keys that must be used to gain access to asset keys; and computer systems to monitor and use all these authentication possibilities. There remains a continuing evolution to make key authentication systems more secure against ever more sophisticated assaults on their vulnerabilities.

SUMMARY

This invention provides another way of identifying and authenticating access to keys. This involves weights of keys mounted on key rings in various combinations. The ring and key combinations are arranged to have different weights, which are then registered with a computer controller for future comparison purposes. A weigh scale associated with a key and ring storage box allows ring and key combinations to be weighed as they are removed from or returned to the storage box or cabinet. The weigh scale is arranged to send a weight signal to the computer controller which can then compare the weight signal with the registered weight for the same ring and key combination. For any discrepancy between the scale weight and the registered weight, the computer can initiate one of many possible security actions.

DRAWINGS

DETAILED DESCRIPTION

Figure 1:
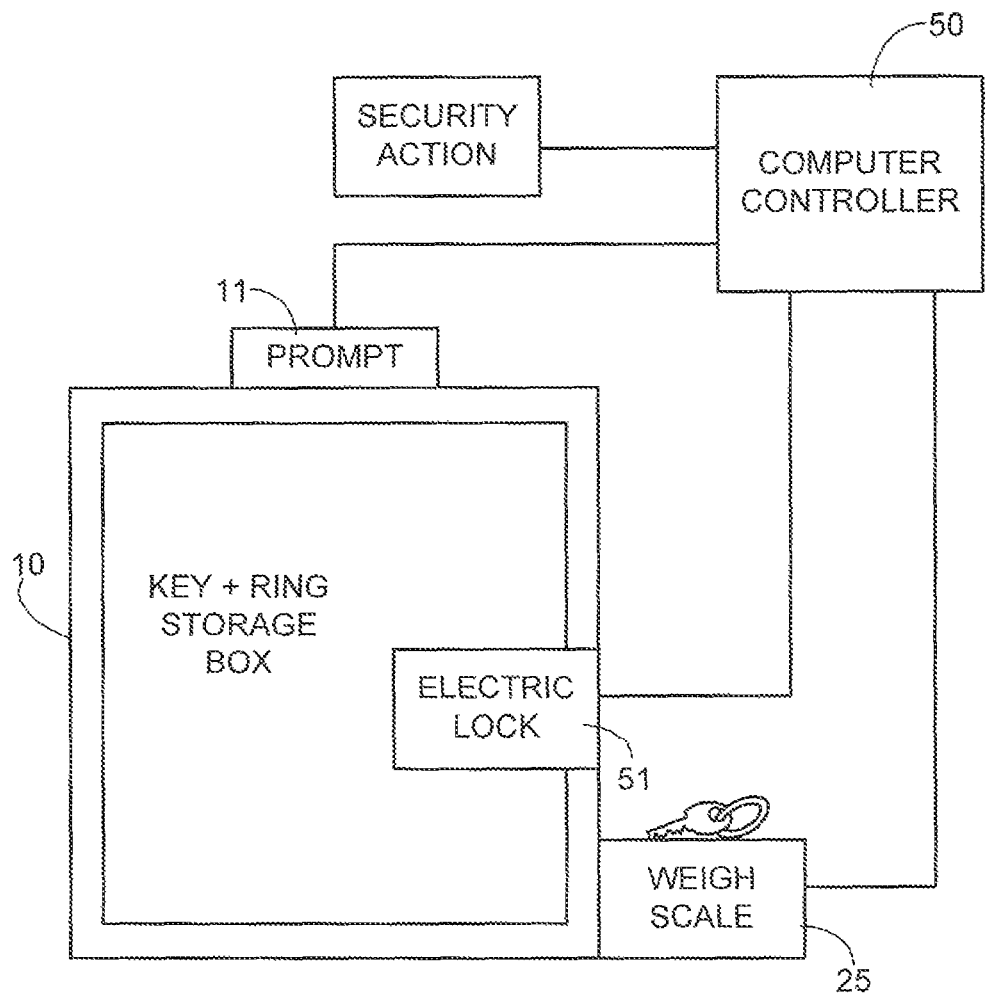
FIG. 1 is a partially schematic view of the inventive system of using weights of ring and key combinations for authentication purposes.
Figure 2:
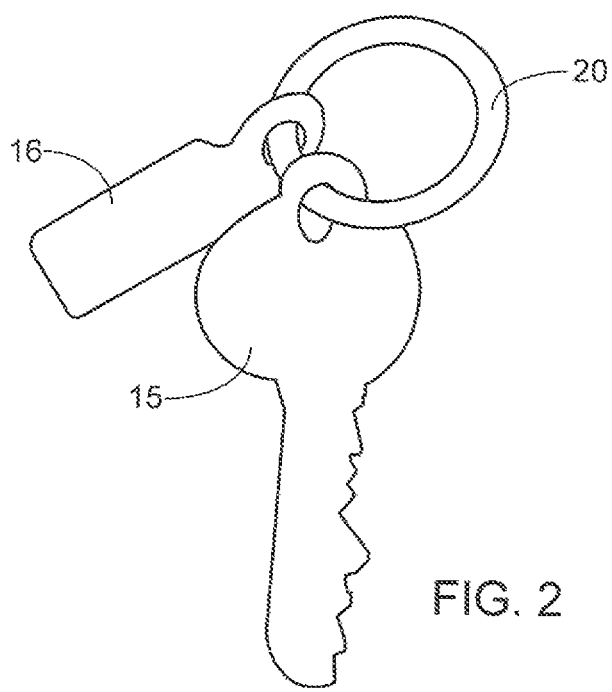
FIGS. 2 and 3 are drawings illustrating two of the many possibilities for ring and key combinations.
Figure 3:
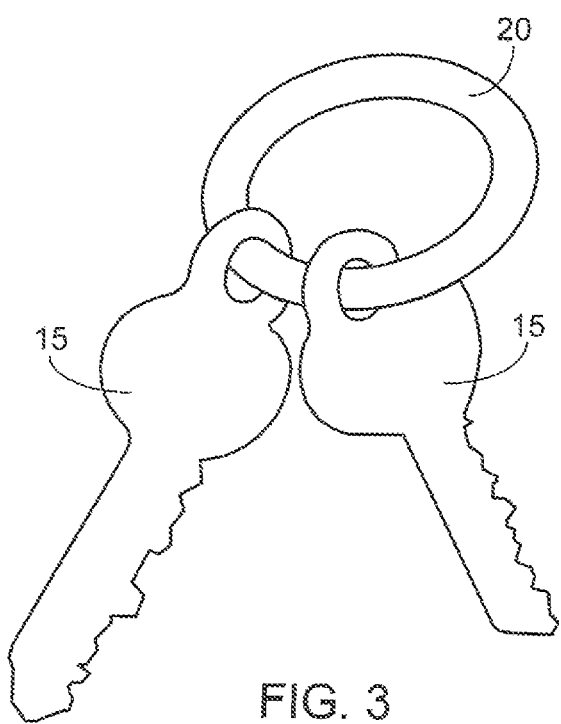
Figure 4:
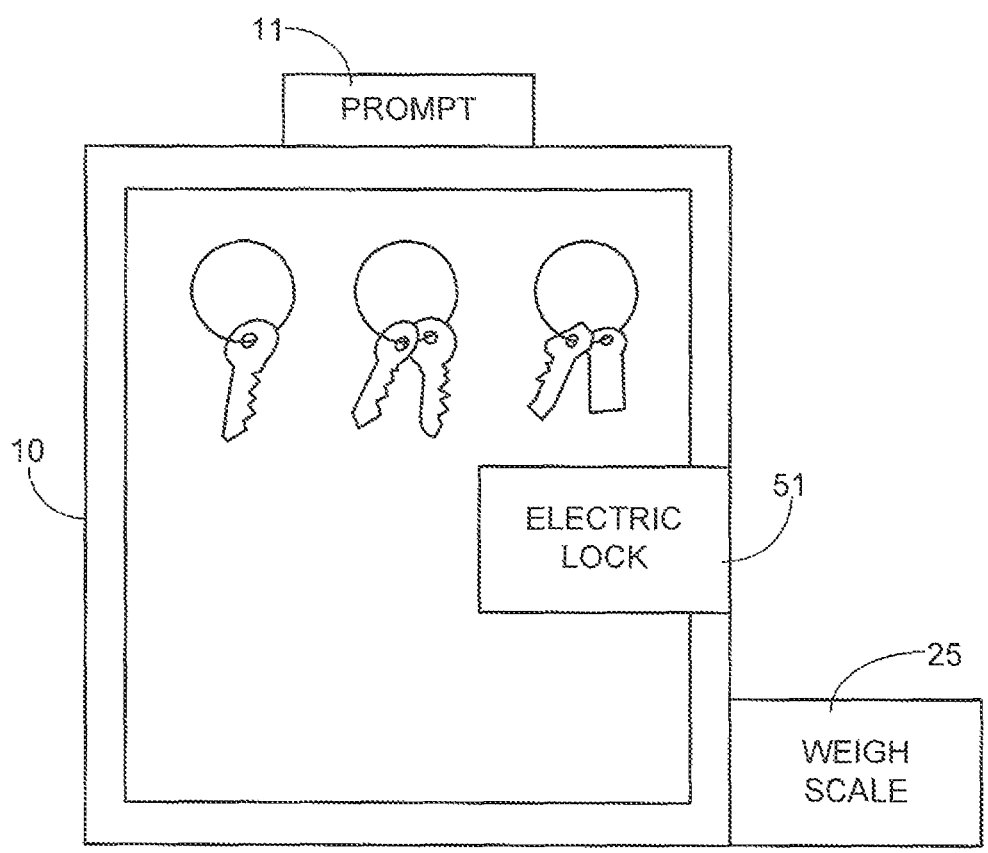
FIG. 4 is a partially schematic view of the key and ring storage box of FIG. 1 with a door removed to show ring and key storage capability.

Applying the invention to a key security system involving many keys and different authorizations of access to keys generally involves one or more key storage boxes 10, and preferably includes a weigh scale 25 associated with each ring and key storage box 10. The collection of keys to be secured is mounted on rings in different combinations suited to the authorization needs of the persons having access to the keys. Each combination of a ring 20 and at least one key 15 is made to have a unique and distinguishable total weight from any other combination of a key 15 and ring 20. This can be accomplished by adding a fob 16, as shown in FIG. 2, to any ring and key combination having a closely similar weight to another ring and key combination.

Once the key collection is mounted on rings in suitable combinations to have distinguishably different weights, then the identity of the ring and key combinations and the weight of each ring and key combination is registered with computer controller 50. The registered information can include the persons who have authorized access to each ring and key combination, and the PINs, control keys, and biometric identifiers of the authorized persons. The key and ring 25 combinations are also preferably assigned to specific key and ring storage boxes 10, if more than one storage box is required. The storage location for each key and ring combination is also registered with computer 50.

Each key and ring storage box 10 is preferably accompanied by a weigh scale 25. This is preferably arranged nearby or possibly within storage box 10. As key and ring combinations are removed from storage box 10 or returned to storage box 10, they can be weighed on scale 25. This sends a weight signal to computer 50, in which the weights of all the key and ring combinations involved in the system have previously been registered. The computer can then compare the scale weight with the registered weight to verify that the weights match. If the scale weight and the registered weight do not match, the computer 50 can initiate a security action, which can involve many possibilities.

A prompt panel 11 at key and ring storage box 10 can indicate that a ring and key combination should be weighed, and can deliver instructions to a person seeking access to the key and ring combinations in storage box 10. If a weight error occurs, the prompt can request that the person involved place the key and ring combination again on scale 25 for verification.

Access to storage box 10 involves a lock of some sort, and this can be an electric lock 51 controlled by computer 50. Number pads, magnetically coded cards, RPID tags, and biometric identifiers can all be involved in admitting access to box 10.

A security supervisor can use the system to open box 10, and weigh each of the ring and key combinations it contains in series to check that none of them have been altered. This security check can involve several key and ring storage boxes, and each of these preferably has an associated weigh scale so that weights of ring and key combinations can be checked conveniently at each box.

Access to key and ring storage box 10 can be conditioned on presenting a ring and key combination to weigh scale 25 that matches the registered weight of a registered key combination authorized to open box 10. Then if a scale weight did not match with a registered weight, access to box 10 would be denied by computer 50.

Presenting a ring and key combination to scale 25 for a weight check can allow computer 50 to determine whether that ring and key combination is authorized to the person seeking access and whether that ring and key combination belongs in the storage box 10 next to the weigh scale 25. Conversely, weighing a ring and key combination being removed from box 10 can inform computer 50 that the person seeking access has selected for removal a ring and key combination that is authorized to that person. Other possibilities are to sound alarms, lock doors, or summon security guards to the location where the discrepancy occurred, produce reports, email, and text messages.

Security actions that computer 50 can initiate include notifying a supervisor of the discrepancy that has occurred, and this notice could include the time of day, the particular key and ring storage box, the key and ring combination having a weight discrepancy, and information on the person presenting the key and ring combination to weigh scale 25. A weight discrepancy can also result in denying access to box 10 or requiring via prompt 11 that the presenter of a discrepant weight follow some other instructions, such as reporting to a particular office.

Weight discrepancies can be caused by a missing key, an extra key, or an extra fob, which can raise a question of whether a key security ring has been tampered with. Discrepancies can also be caused by security invasions that have yet to be devised.

What is claimed is:

1. A key identification system comprising:
   keys to be identified being placed on key rings;
   a weight and an identity of each ring and key combination being registered with a controller;
   a weigh scale arranged outside of a storage box for ring and key combinations, the weigh scale being adapted to weigh ring and key combinations;
   the weigh scale delivering to the controller a signal corresponding to a weight of a ring and key combination;
   the controller being adapted to compare a scale weight of a ring and key combination with a registered weight of the same ring and key combination; and
   the controller using the weight signal to control access to the storage box.

2. The key identification system of claim 1 wherein a plurality of keys are arranged on a single ring.

3. The key identification system of claim 1 wherein a ring and key combination includes a fob.

4. The key identification system of claim 1 wherein the controller initiates a security action if the scale weight differs from the registered weight.

5. The key identification system of claim 1 wherein the controller combines the weight signal with other indicia of identity to control access to the storage box.

6. A method of identifying a ring and key combination, the method comprising:
   using a weigh scale outside of a key storage, box to weigh the ring and key combination so that the weigh scale produces a signal corresponding to the weight of the ring and key combination;
   comparing the weight signal with a pre-determined weight of the same ring and key combination to authenticate identity of the ring and key combination; and
   granting access to the key storage box only on presentation to the weigh scale of a ring and key combination having the predetermined weight.

7. The method of claim 6 including using a computer to store the predetermined weight and compare this with the weight signal.

8. The method of claim 7 including using the computer to control access to a storage box for the ring and key combination.

9. The method of claim 6 including adding a fob to as ring and key combination having a weight similar to another ring and key combination.

10. A method of securing a key storage system, the method comprising:
    forming ring and key combinations differing in total weight;
    registering the weight and identity of each combination with a computer;
    providing a weigh scale outside a key and ring storage box;
    arranging the weigh scale to send to the computer a signal based on the weight of a ring and key combination weighed by the scale;
    arranging the computer to compare the weight signal with a registered weight as an identifier of the weighed ring and key combination; and
    using the computer to deny access to the key storage box unless the weight signal matches the registered weight.

11. The method of claim 10 including programming the computer to initiate a security action whenever the weight signal differs from the registered weight.

12. The method of claim 10 including adding a fob to a ring and key combination having a weight similar to another ring and key combination.

13. A key storage system comprising:
    a key storage box affording access to keys on key rings stored in the box;
    a weigh scale arranged outside of the key storage box and adapted to weigh a ring and key combination;
    the weigh scale being arranged to send to a computer a weight signal corresponding to the weight of the ring and key combination being weighed by the scale;
    the computer being arranged to compare the weight signal with a predetermined weight of the same ring and key combination to authenticate identity of the ring and key combination for security purposes; and
    using the computer to grant access to the key storage box only upon presentation to the weigh scale of a key and ring combination having the predetermined weight.

14. The key storage system of claim 13 wherein each combination of keys on key rings has a distinguishably different total weight.

15. The key storage system of claim 14 including a fob added to a ring and key combination to distinguish a predetermined total weight.

16. The key storage system of claim 13 wherein the computer is arranged to initiate a security action whenever a weight signal differs from a predetermined weight.

* * * * *